2,886,566
Patented May 12, 1959

2,886,566

3-OXO-7-SULFAMYL-3,4-DIHYDRO-1,2,4-BENZO-THIADIAZINE-1,1-DIOXIDE COMPOUNDS

Frederick C. Novello, Lansdale, Pa., assignor to Merck & Co., Inc., Rahway, N.J., a corporation of New Jersey No Drawing. Application July 30, 1957
Serial No. 674,998

5 Claims. (Cl. 260—243)

This invention is concerned with novel 3-oxo-3,4-dihydro-1,2,4-benzothiadiazine-1,1-dioxide compounds which contain a sulfamyl substituent in the benzenoid portion of the nucleus. The structural formula of the new compounds of this invention is illustrated below. In those compounds having no substituent other than hydrogen on either nitrogen in the benzothiadiazine- 1,1-dioxide nucleus, the molecules possess a lactam-lactim tautomeric system wherein the tautomers are interconvertible by means of an alpha, gamma proton shift; the double bond in the lactim tautomer being between either the 2,3- or 3,4-positions (that is structures A, B, and C, below, wherein $R^1$ is hydrogen). In those compounds having a substituent other than hydrogen on the $N^2$ atom, the double bond in the lactim tautomer exists between positions 3 and 4, (that is, structure B, below, wherein $R^1$ is lower alkyl) and when substitution other than hydrogen occurs on the $N^4$ atom, the double bond in the lactim tautomer exists between positions 2 and 3 (that is, structure C, below, wherein $R^1$ is lower alkyl). When substitution other than hydrogen occurs on both the $N^2$ and $N^4$ atoms, the molecule can exist only in the lactam form (that is, structure A, below, wherein $R^1$ is lower alkyl). Thus, in general, the compounds can be considered having one of the general structures A, B, or C:

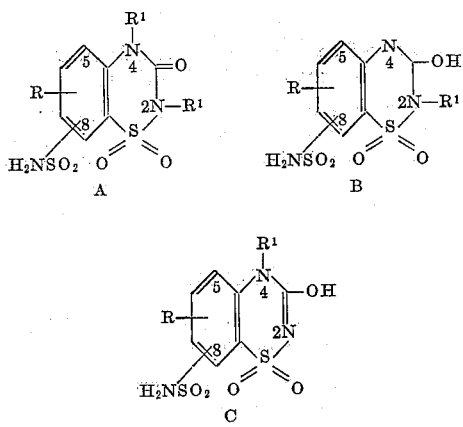

The novel 3-oxo-3,4-dihydro-1,2,4-benzothiadiazine-1,1-dioxide compounds of this invention therefore comprise compounds having a general structure as illustrated and defined above, and include their non-toxic alkali metal salts, wherein R is hydrogen, a halogen as chlorine, bromine or fluorine, a lower alkyl radical advantageously having from 1 to 5 carbon atoms, a lower alkoxy radical also advantageously containing from 1 to 5 carbon atoms in the alkyl portion of the radical, and nitro or amino groups, and $R^1$ is hydrogen or an alkyl radical.

The novel compounds of the invention are useful pharmacotherapeutic agents particularly because of their diuretic and/or natriuretic properties. They can be administered in therapeutic dosages in conventional vehicles as in the form of tablets, pills, capsules, and the like as these compounds are effective upon oral administration. As the compounds of this invention also are soluble in a dilute alkaline medium or in polyethylene glycol, injectable solutions can be prepared for parenteral administration by dissolving the compound in the selected medium to which preservatives can be added if desired. Dosages between about 5 to about 10 mgs./kg./day generally are suitable to produce a diuretic or natriuretic response. Of course, more or less of the active ingredient can be employed depending upon the age and condition of the individual who is to receive the compound and for this reason scored tablets comprising 0.5 g. of active ingredient or more can be supplied to the physician for the symptomatic adjustment of dosage to the individual patient. These recommended dosages appear to be well below the toxic dose of the compounds as evidenced by the fact the acute oral $LD_{50}$ in mice of one of the compounds falling within the scope of this invention, that is, 6-bromo-3-oxo-7-sulfamyl-3,4-dihydro-1,2,4-benzothiadiazine-1,1-dioxide, was found to be greater than 600 mg./kg. and no toxic reactions were observed when this compound was administered to dogs, intravenously, at dosages up to 15 mg./kg.

The diuretic and/or natriuretic properties of the novel compounds of this invention make them particularly useful in the treatment of congestive heart failure and other abnormalities which produce an edematous condition in the body.

The novel 3-oxo-3,4-dihydro-1,2,4-benzothiadiazine-1,1-dioxides of this invention can be prepared by heating a mixture of the selected disulfamylaniline compound with urea at a temperature of between about 175 to 225° C. It is preferred to employ the reactants in the ratio of about one part of the selected aniline compound to two parts of urea, although an excess of two equivalents of urea can be employed without harmful effects. Heating of the reactants is continued until the mixture liquifies at which time ammonia gas is given off and thereafter the mixture resolidifies. The 3-oxo-3,4-dihydro-1,2,4-benzothiadiazine-1,1-dioxide thus produced then is dissolved advantageously in water, filtered, and the product precipitated by the addition of acid. Purification advantageously is effected by crystallization from either water or aqueous alcohol.

The preparation of the disulfamylaniline starting materials employed in the above reaction is described in detail in my copending U.S. patent applications, Serial No. 582,082, filed May 2, 1956, now Patent No. 2,809,194, and Serial No. 638,701, filed February 7, 1957. In general, the disulfamylaniline compounds are prepared by chlorosulfonating the proper, known aniline compound in the presence of an alkali metal halide thus forming the corresponding aniline disulfonyl chloride which then is treated with ammonia to form the desired disulfamylaniline compound.

The preparation of the novel compounds of this invention is more fully described in the following examples. It is to be understood, however, that the examples are illustrative of the compounds embraced by this invention and of the method for their preparation and are not to be construed as limiting the invention to the particular compounds or methods specifically described.

In the following examples all compounds are named, for convenience, as the lactam tautomer (that is, structure A, column 1). The structure of the products prepared by the processes described below must, however, be evaluated in the light of the foregoing discussion regarding the lactam-lactim tautomerism which the molecules can possess.

EXAMPLE 1

*6-chloro-3-oxo-7-sulfamyl-3,4-dihydro-1,2,4-benzothiadiazine-1,1-dioxide*

An intimate mixture of 5-chloro-2,4-disulfamylaniline (8.4 g., 0.03 mole) and urea (3.5 g., 0.06 mole) is heated in an oil bath at 200° C. for 40 minutes. The mixture liquifies with evolution of ammonia and solidifies after 30 minutes of heating. After cooling, the solid is dissolved in water, filtered, and acidified with dilute hydrochloric acid. The product crystallizes from aqueous alcohol yielding 4.3 g. (46% of theory) of 6-chloro-3-oxo-7-sulfamyl-3,4-dihydro-1,2,4-benzothiadiazine-1,1-dioxide in the form of colorless plates, M.P. 313° C. (dec., with previous darkening).

*Analysis.*—Calculated for $C_7H_6ClN_3O_5S_2$: C, 26.97; H, 1.94; N, 13.48. Found: C, 27.29; H, 2.10; N, 13.44.

EXAMPLE 2

*5-chloro-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 6-chloro-2,4-disulfamylaniline and following substantially the same procedure described in Example 1, there is obtained 5-chloro-3-oxo-7-sulfamyl-3,4-dihydro-1,2,4-benzothiadiazine-1,1-dioxide in the form of colorless plates, M.P. 314–315° C. (dec., with previous darkening).

*Analysis.*—Calculated for $C_7H_6ClN_3O_5S_2$: C, 26.97; H, 1.94; N, 13.48. Found: C, 27.09; H, 2.20; N, 13.48.

EXAMPLE 3

*7-chloro-3-oxo-6-sulfamyl-3,4-dihydro-1,2,4-benzothiadiazine-1,1-dioxide*

By replacing the 5-chloro-2,4-disulfamylaniline employed in Example 1 by an equimolecular quantity of 4-chloro-2,5-disulfamylaniline and following substantially the same procedure described in Example 1, there is obtained, following crystallization from water, 7-chloro-3-oxo-6-sulfamyl-3,4-dihydro-1,2,4-benzothiadiazine-1,1-dioxide in the form of colorless plates, M.P. 323–324° C. (dec., with previous darkening).

*Analysis.*—Calculated for $C_7H_6ClN_3O_5S_2$: C, 26.97; H, 1.94; N, 13.48. Found: C, 27.23; H, 2.06; N, 13.47.

EXAMPLE 4

*6-bromo-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-bromo-2,4-disulfamylaniline and following substantially the same procedure described in Example 1, there is obtained 6-bromo-3-oxo-7-sulfamyl-3,4-dihydro-1,2,4-benzothiadiazine-1,1-dioxide as colorless plates, M.P. 323–324° C. (dec., with previous darkening).

*Analysis.*—Calculated for $C_7H_6BrN_3O_5S_2$: C, 23.60; H, 1.70; N, 11.80. Found: C, 23.76; H, 1.97; N, 11.83.

EXAMPLE 5

*6-methyl-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-methyl-2,4-disulfamylaniline and following substantially the same procedure described in Example 1, there is obtained, following crystallization from water, 6-methyl-3-oxo-7-sulfamyl-3,4-dihydro-1,2,4-benzothiadiazine-1,1-dioxide in the form of colorless plates, M.P. 307–308° C. (dec., with previous darkening).

*Analysis.*—Calculated for $C_8H_9N_3O_5S_2$: C, 32.98; H, 3.11; N, 14.42. Found: C, 32.98; H, 3.29; N, 14.37.

EXAMPLE 6

*6-methoxy-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-methoxy-2,4-disulfamylaniline and following substantially the same procedure described in Example 1, there is obtained, after recrystallization from water, 6-methoxy-3-oxo-7-sulfamyl-3,4-dihydro-1,2,4-benzothiadiazine-1,1-dioxide in the form of colorless plates, M.P. 291–293° C. (dec., with previous darkening).

*Analysis.*—Calculated for $C_8H_9N_3O_6S_2$: C, 31.27; H, 2.95; N, 13.67. Found: C, 31.32; H, 3.10; N, 13.66.

EXAMPLE 7

*6-nitro-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-nitro-2,4-disulfamylaniline and following substantially the same procedure described in Example 1, there is obtained 6-nitro-3-oxo-7-sulfamyl-3,4-dihydro-1,2,4-benzothiadiazine-1,1-dioxide as pale yellow plates, M.P. greater than 350° C.

*Analysis.*—Calculated for $C_7H_6N_4O_7S_2$: C, 26.08; H, 1.88; N, 17.38. Found: C, 26.47; H, 2.14; N, 17.99.

EXAMPLE 8

*6-amino-3-oxo-7-sulfamyl-3,4-dihydro-1,2,4-benzothiadiazine-1,1-dioxide*

A solution of 3.2 g. of 6-nitro-3-oxo-7-sulfamyl-3,4-dihydro-1,2,4-benzothiadiazine-1,1-dioxide, prepared as described in Example 7, in 300 ml. of 50% aqueous alcohol is shaken in an atmosphere of hydrogen with 300 mg. of platinum oxide catalyst until hydrogen absorption ceases. The catalyst is removed by filtration and the filtrate concentrated to dryness in vacuo. Recrystallization of the residual solid from aqueous alcohol gives 6-amino-3-oxo-7-sulfamyl-3,4-dihydro-1,2,4-benzothiadiazine-1,1-dioxide.

EXAMPLE 9

*6-fluoro-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-fluoro-2,4-disulfamylaniline and following substantially the same procedure described in Example 1, there is obtained 6-fluoro-3-oxo-7-sulfamyl-3,4-dihydro-1,2,4-benzothiadiazine-1,1-dioxide.

EXAMPLE 10

*6-amyl-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5-amyl-2,4-disulfamylaniline and following substantially the same procedure described in Example 1, there is obtained 6-amyl-3-oxo-7-sulfamyl-3,4-dihydro-1,2,4-benzothiadiazine-1,1-dioxide.

EXAMPLE 11

*7-butoxy-3-oxo-6-sulfamyl-3,4-dihydro-1,2,4-benzothiadiazine-1,1-dioxide*

By replacing the 5-chloro-2,4-disulfamylaniline employed in Example 1 by an equimolecular quantity of 4-butoxy-2,5-disulfamylaniline and following substantially the same procedure described in Example 1, there is obtained 7-butoxy-3-oxo-6-sulfamyl-3,4-dihydro-1,2,4-benzothiadiazine-1,1-dioxide.

EXAMPLE 12

*6-chloro-4-methyl-3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 5 - chloro - 2,4 - disulfamyl - N - methylaniline and following substantially the same process described in Example 1, there is obtained 6-chloro-4-methyl-3-oxo-7-sulfamyl - 3,4 - dihydro - 1,2,4 - benzothiadiazine - 1,1 - dioxide.

EXAMPLE 13

*6-chloro-2-methyl-3-oxo-7-sulfamyl-3,4-dihydro-1,2,4-benzothiadiazine-1,1-dioxide*

4-chloro-2-nitrobenzenesulfonyl chloride is prepared from 2,5-dichloronitrobenzene by substantially the same procedure described in Organic Synthesis, Collective Vol. 2, page 471 (John Wiley & Sons, New York, New York, 1943), for the preparation of 2-nitro-benzenesulfonyl chloride from 2-chloro-nitrobenzene. The 4-chloro-2-nitrobenzenesulfonyl chloride thus obtained is reacted at room temperature with methylamine to form 5-chloro-2-N-methylsulfamylnitrobenzene, which compound is reduced with iron powder and hydrochloric acid to form 5-chloro-2-N-methylsulfamylaniline. The product thus obtained is substituted for the 5-chloro-2,4-disulfamyl-aniline employed in Example 1, in an equimolecular quantity, and by following substantially the same procedure as described in Example 1 there is obtained 6-chloro - 2 - methyl - 3 - oxo - 3,4 - dihydro - 1,2,4 - benzothiadiazine-1,1-dioxide. The latter compound is heated on the steam bath with chlorosulfonic acid for two hours, cooled, and poured onto ice. Treatment of the product obtained with 28% ammonium hydroxide yields 6-chloro-2 - methyl - 3 - oxo - 7 - sulfamyl - 3,4 - dihydro - 1,2,4-benzothiadiazine-1,1-dioxide.

EXAMPLE 14

*6-chloro-2,4-dimethyl-3-oxo-7-sulfamyl-3,4-dihydro-1,2,4-benzothiadiazine-1,1-dioxide*

6 - chloro - 2 - methyl - 3 - oxo - 3,4 - dihydro - 1,2,4-benzothiadiazine-1,1-dioxide prepared as described in Example 13, is dissolved in two equivalents of aqueous sodium hydroxide and treated at room temperature with one equivalent of dimethylsulfate to give 6-chloro-2,4-dimethyl - 3 - oxo - 3,4 - dihydro - 1,2,4 - benzothiadiazine-1,1-dioxide which, upon heating with chlorosulfonic acid and subsequent treatment of the product with 28% ammonium hydroxide by substantially the same method described in the preceeding example, yields 6-chloro-2,4-dimethyl - 3 - oxo - 7 - sulfamyl - 3,4 - dihydro - 1,2,4-benzothiadiazine - 1,1 - dioxide.

EXAMPLE 15

*3-oxo-7-sulfamyl-3,4-dihydro-1,2,4-benzothiadiazine-1,1-dioxide*

By replacing the 5-chloro-2,4-disulfamylaniline employed in Example 1 by an equimolecular quantity of 2,4-disulfamylaniline and following substantially the same procedure described in Example 1, there is obtained 3-oxo - 7 - sulfamyl - 3,4 - dihydro - 1,2,4 - benzothiadiazine-1,1-dioxide.

EXAMPLE 16

*3-oxo-6-sulfamyl-3,4-dihydro-1,2,4-benzothiadiazine-1,1-dioxide*

By replacing the 5-chloro-2,4-disulfamylaniline employed in Example 1 by an equimolecular quantity of 2,5-disulfamylaniline and following substantially the same procedure described in Example 1, there is obtained 3 - oxo - 6 - sulfamyl - 3,4 - dihydro - 1,2,4 - benzothiadiazine-1,1-dioxide.

EXAMPLE 17

*Sodium salt of 6-bromo-3-oxo-7-sulfamyl-3,4-dihydro-1,2,4-benzothiadiazine-1,1-dioxide*

6 - bromo - 3 - oxo - 7 - sulfamyl - 3,4 - dihydro - 1,2,4-benzothiadiazine-1,1-dioxide, obtained as described in Example 4, is dissolved in alcholic sodium hydroxide and the solution then evaporated in vacuo to yield the sodium salt of 6 - bromo - 3 - oxo - 7 - sulfamyl - 3,4 - dihydro-1,2,4-benzothiadiazine-1,1-dioxide.

EXAMPLE 18

*Compressed tablet comprising 0.5 g. active ingredient*

|  | Grams |
|---|---|
| 6 - bromo - 3 - oxo - 7 - sulfamyl - 3,4 - dihydro-1,2,4-benzothiadiazine-1,1-dioxide | 500.0 |
| Starch paste 12½%, 100 cc., allow | 12.5 |
|  | 512.5 |
| Starch U.S.P., corn | 25.0 |
| Magnesium stearate | 5.5 |
|  | 543.0 |

The 6 - bromo - 3 - oxo - 7 - sulfamyl - 3,4 - dihydro-1,2,4-benzothiadiazine-1,1-dioxide is granulated with the starch paste and while moist passed through a No. 14 screen, dried at 45° C. for twenty hours and then passed three times through a No. 14 screen. The starch then is passed through a No. 90 bolting cloth onto the granulation and all ingredients are blended thoroughly. Then the magnesium stearate is passed through a No. 90 bolting cloth onto the granulation and these ingredients are blended, after which the granulation is compressed, using a 14/32″ flat, bevelled, scored punch, into tablets having a thickness of 0.205±0.005″ yielding 1,000 tablets each weighing 0.543 g. and having a hardness of about 6 kgms. measured by the Monsanto Chemical Company Tablet Hardness Tester Apparatus, and a disintegration time of five minutes when tested on the U.S.P. Tablet Disintegrating Apparatus (U.S. Pharmacopeia, 15th edition, page 937).

While the above examples describe the preparation of certain illustrative compounds illustrated by the structure in column 1, and a certain specific dosage form suitable for administering the novel compounds of this invention in human therapy, it is to be understood that the invention is not to be considered limited to these examples or the specific reaction conditions described for the preparation of the compounds or by the specific ingredients included in the pharmaceutical preparation, but is understood to embrace variations and modifications falling within the scope of the appended claim.

What is claimed is:

1. 3 - oxo - benzothiadiazine - 1,1 - dioxide compounds selected from the class consisting of compounds having one of the general structural formulae

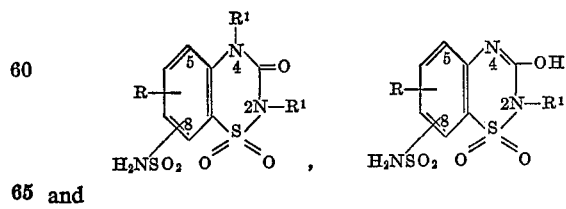

and

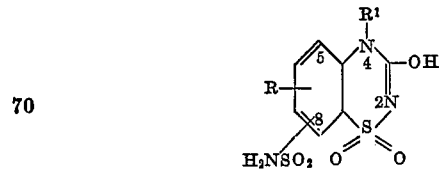

and their non-toxic alkali metal salts, wherein R is selected from the group consisting of hydrogen, halogen, lower alkyl, lower alkoxy, nitro and amino radicals; and $R^1$ is selected from the group consisting of hydrogen and lower alkyl radicals.

2. 3 - oxo - benzothiadiazine - 1,1 - dioxide compounds having one of the general structural formulae

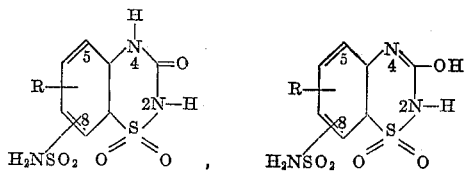

and

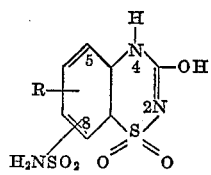

wherein R is a halogen.

3. 6-bromo-3-oxo-7-sulfamyl-3,4-dihydro-1,2,4-benzothiadiazine-1,1-dioxide.

4. 6-chloro-3-oxo-7-sulfamyl-3,4-dihydro-1,2,4-benzothiadiazine-1,1-dioxide.

5. A process for preparing a 3-oxo-3,4-dihydro-1,2,4-benzothiadiazine-1,1-dioxide compound comprising heating at a temperature between about 175–225° C. a mixture of an aniline compound having the general structural formula

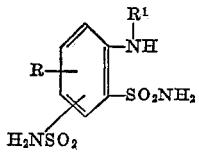

wherein R is selected from the group consisting of hydrogen, halogen, lower alkyl, lower alkoxy, and nitro radicals, and $R^1$ is selected from the group consisting of hydrogen and lower alkyl radicals; with urea to form the corresponding 3-keto-3,4-dihydro-1,2,4-benzothiadiazine-1,1-dioxide compound having one of the general structural formulae

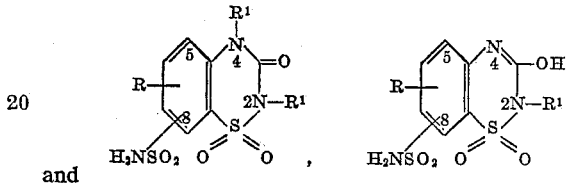

and

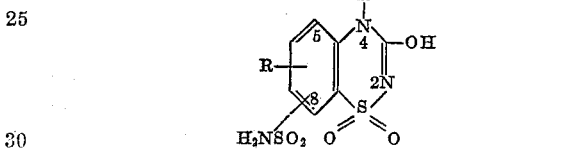

wherein R and $R^1$ have the meaning assigned each of them above.

No references cited.